United States Patent
Forsbach et al.

[19]

[11] Patent Number: 6,053,488
[45] Date of Patent: Apr. 25, 2000

[54] SPRING DAMPER DEVICE BETWEEN A WHEEL AND THE BODY OF A MOTOR VEHICLE

[75] Inventors: Michael Forsbach, Weinstadt; Helmut Luncz, Korntal-Muenchingen; Joachim Wirtz; Peter Fritz, both of Stuttgart, all of Germany

[73] Assignee: DaimlerChrysler AG, Suttgart, Germany

[21] Appl. No.: 09/125,698

[22] PCT Filed: Feb. 20, 1997

[86] PCT No.: PCT/EP97/00796

§ 371 Date: Apr. 26, 1999

§ 102(e) Date: Apr. 26, 1999

[87] PCT Pub. No.: WO97/30862

PCT Pub. Date: Aug. 28, 1997

[30] Foreign Application Priority Data

Feb. 24, 1996 [DE] Germany .............................. 196 06 990

[51] Int. Cl.[7] ........................ B60G 17/027; B60G 17/015
[52] U.S. Cl. .................. 267/221; 188/266.1; 188/1.11 E
[58] Field of Search ........................... 188/1.11 E, 266.1, 188/266.2, 266.3, 266.4, 266.5, 266.7, 282.3; 280/5.514, 5.507, 124.157, 6.159; 267/64.28, 64.11, 221, 286–291; 324/207.16, 207.15

[56] References Cited

U.S. PATENT DOCUMENTS

| 5,009,450 | 4/1991 | Herberg et al. ...................... 188/266.1 |
| 5,810,335 | 9/1998 | Wirtz et al. .............................. 267/221 |

FOREIGN PATENT DOCUMENTS

| 0 486 848 A1 | 5/1992 | European Pat. Off. . |
| 1 876 372 | 7/1963 | Germany . |
| 29 11 786 A1 | 10/1980 | Germany . |
| 35 02 579 A1 | 7/1986 | Germany . |
| 42 25 968 A1 | 2/1994 | Germany . |
| 42 31 641 A1 | 3/1994 | Germany . |
| 42 44 204 A1 | 6/1994 | Germany . |
| 2 164 417 | 3/1986 | United Kingdom . |
| 2 288 577 | 10/1995 | United Kingdom . |

*Primary Examiner*—Douglas C. Butler
*Attorney, Agent, or Firm*—Evenson, McKeown, Edwards & Lenahan, P.L.L.C.

[57] ABSTRACT

A spring damper device is arranged between a wheel and a body of a motor vehicle. A damper cylinder and a piston rod co-operates with the latter. The damper device is directly articulatable between the body of the motor vehicle and a guide element of the wheel. A spring is tensioned between a body-side and a wheel-side abutment, and the clearance between the abutments is variable by a hydraulic adjusting device and measuring devices operable without contact therebetween to determine an installed length of the damper and clearance of the abutment for the spring. The damper and the spring extend coaxially, with the hydraulic adjusting device comprising a cylindrical housing configured to engage with an annular clearance around the piston rod and is sealed and guided radially at axial ends relative to this piston rod. The cylindrical housing is displaceable relative to the piston rod by hydraulic pressure acting on the annular space. The measuring devices are position-transmitters, one being fitted to the damping cylinder and another being fitted to the adjusting device. A sensor is fixedly connected to the piston rod being assigned to each position transmitter and are situated in a common tubular holder.

1 Claim, 2 Drawing Sheets

SPRING DAMPER DEVICE BETWEEN A WHEEL AND THE BODY OF A MOTOR VEHICLE

BACKGROUND OF THE INVENTION

This application claims the priority of German application 196 06 990.4 and PCT/EP97/00796, filed Feb. 24, 1996 and Feb. 20, 1997, respectively, the disclosure of which are expressly incorporated by reference herein.

The present invention relates to a spring damper between a wheel and a motor vehicle body which includes a damper cylinder and a piston rod co-operating with the latter and is directly articulated between the body of the vehicle and a guide element of the wheel, the spring is tensioned between a body-side and a wheel-side abutment, the clearance between the abutments can be varied by a hydraulic adjusting device and in which measuring devices operating without contact are provided to determine the installed length of the damper as well as the clearance of the abutment for the spring.

GB 2 288 577 A shows a shock absorber and spring disposed side by side, extending parallel to one another. The nature of the measuring device is not described.

DE 35 02 579 A discloses a spring damper device of coaxial construction, having a device for adjusting the clearance of the abutments of the spring. Clearance measuring devices are not provided therein.

DE 42 44 204 A describes a shock absorber in which hydraulic fluid is displaceable by a displacement body from a damping cylinder via a throttle against an air cushion. The initial position of the displacement body in the damping cylinder, and thus the clearance between the articulations at the body and the guide of a wheel can be varied by a separately possible variation of the hydraulic fluid flow within the damping cylinder.

SUMMARY OF THE INVENTION

An object of the present invention is to provide a spring damping device which, having a simple construction, also has a small dimension perpendicular to the stroke direction and can operate with clearance measuring devices which are likewise of simple construction and can be accommodated in space-saving fashion.

This object has been achieved by providing a spring damper device in which device having the damper and the spring extend coaxially, the hydraulic adjusting device comprises a cylindrical housing which engages with annular clearance around the piston rod and is sealed and guided radially at the axial ends relative to this piston rod, the housing being displaceable relative to the piston rod by hydraulic pressure acting on the annular space, the measuring devices comprise a position transmitter, one of which is fitted to the damping cylinder and one to the adjusting device, a sensor fixedly connected to the piston rod being assigned to each position transmitter, the sensors are situated in a common tubular holder.

In accordance with the present invention, the sensors of the clearance measuring device are disposed, in a simple and reliably mounted manner in design terms to lie one behind the other in a common tubular holder. This tubular holder can be disposed parallel to the piston rod of the vibration damper or may also be integrated into the piston rod, in that the piston rod itself forms the holder.

According to the present invention, the piston rod is advantageously integrated into a hydraulic assembly to vary the clearance between the body element and the guide element of a wheel of a motor vehicle. The installed length of the vibration damper is altered by this hydraulic assembly, in that the piston rod is inserted more or less deeply into the damping cylinder and oscillates relative to this adjustable position during travel. A common evaluation of the distance measuring systems set up according to the invention allows the respective clearance between the articulations of the vibration damper on the vehicle body on the one hand and the guide element of an assigned wheel on the other hand to be determined unambiguously by way which are simple in terms of design and function, and specifically even when the piston rod is oscillating, over the entire progression of the oscillation.

DETAILED DESCRIPTION OF THE DRAWINGS

Figure 1:
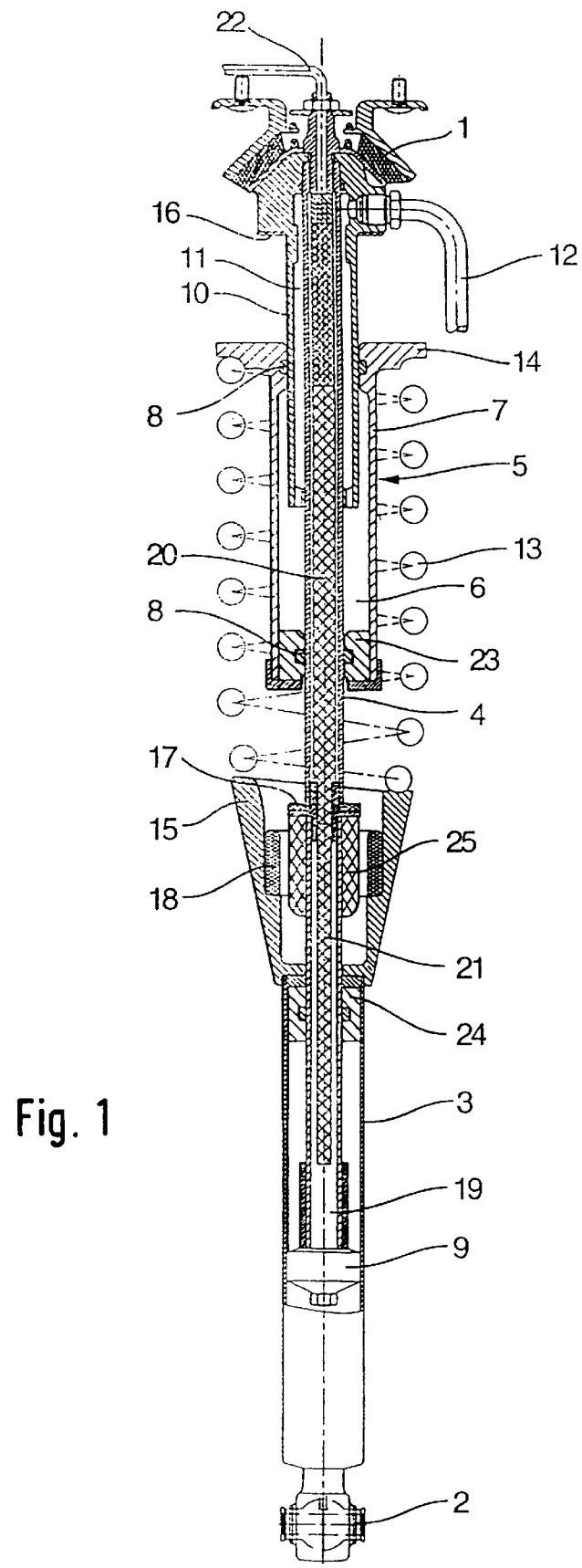
FIG. 1 is a longitudinal cross-section view through a spring shock absorber device, representing a spring leg of a motor vehicle, with radially internally disposed sensors of a distance measuring system.

The spring leg is arranged so as to be pivotable by universal joints with a body-side joint 1 on a vehicle body (not illustrated) and with a wheel-side joint 2 on a wheel guide element (likewise not illustrated), for example an axle.

In the spring leg, the damping cylinder 3 of the shock absorber adjoins the wheel-side joint 2, while the piston rod 4 of this shock absorber is connected to the body-side joint 1. The piston rod 4 projects out of the damping cylinder 3 over a relatively large area. In this area, a hydraulic adjusting device 5 acts on the piston rod 4. This hydraulic adjusting device 5 serves to vary the driving position of the vehicle or to adapt it to the respective current operating conditions. With such an adjusting device, in particular pitching and rolling movements or inclined positions of the vehicle body should be able to be compensated automatically. How this can take place specifically with a device of this type is described in detail, inter alia, in DE 42 31 641 A1, so that it is not necessary to give further details of the relevant mode of operation here.

The adjusting device 5 has a cylindrical housing 7 as a movable element to vary the volume of a hydraulic operating space 6. This housing 7 is sealed at its axial ends relative to the piston rod 4 by annular seals 8 for the sealed termination of the hydraulic operating space 6. The lower one of these two seals 8 acts in an area of the piston rod 4 in which the latter has a first diameter up to a displacement piston 9 within the damping cylinder 3. In contrast, the upper seal 8 engages around the piston rod 4 in an area with a larger second diameter. The larger second diameter is achieved by a tubular sleeve 10 of the piston rod 4. An annular gap 11 between the tubular sleeve 10 and the piston rod 4 lying radially therein serves as a hydraulic fluid supply line to and from the hydraulic operating space 6. The annular gap 11 is connected via a line 12 to a controlled hydraulic fluid store (not illustrated).

The clearance between the two joints 1, 2 is varied by displacement owing to a change in the volume of the hydraulic operating space 6. When the volume of the hydraulic operating space 6 is kept constant, the cylindrical housing 7 of the hydraulic adjusting device 5 is operatively firmly connected to the piston rod 4. In this case, the vehicle body rests on the damping cylinder 3 of the shock absorber by connection to the joint 1 via a spring 13. An annular collar 14 on the cylindrical housing 7 constitutes the body-side abutment of the spring 13, while the wheel-side abutment is a bell-shaped annular collar 15 which is firmly connected to the upper end of the damping cylinder 3. If deflection or rebound of the spring 13 takes place when the adjusting device 5 is inactive, that is to say with the cylindrical housing 7 at rest relative to the piston rod 4, only the damping cylinder 3 moves for vibration damping with the piston rod 4 practically at rest.

The cylindrical housing 7 of the hydraulic adjusting device 5 can be displaced between stops 16, 17 of the piston rod 4 by varying the volume of the hydraulic operating space 6. In this area, the height of the vehicle body, that is to say the clearance between the two joints 1, 2, can thus be varied. To limit the oscillation amplitude of the shock absorber, a further padded stop 25, which strikes against the damping cylinder 3 when a predetermined amplitude has been reached, is provided on the piston rod 4 on the back of the stop 17. The stop 18, by way of which deflection of the piston rod 4 in the direction of the damping cylinder 3 is limited, serves to prevent the spring 13 falling below the block size.

Figure 2:
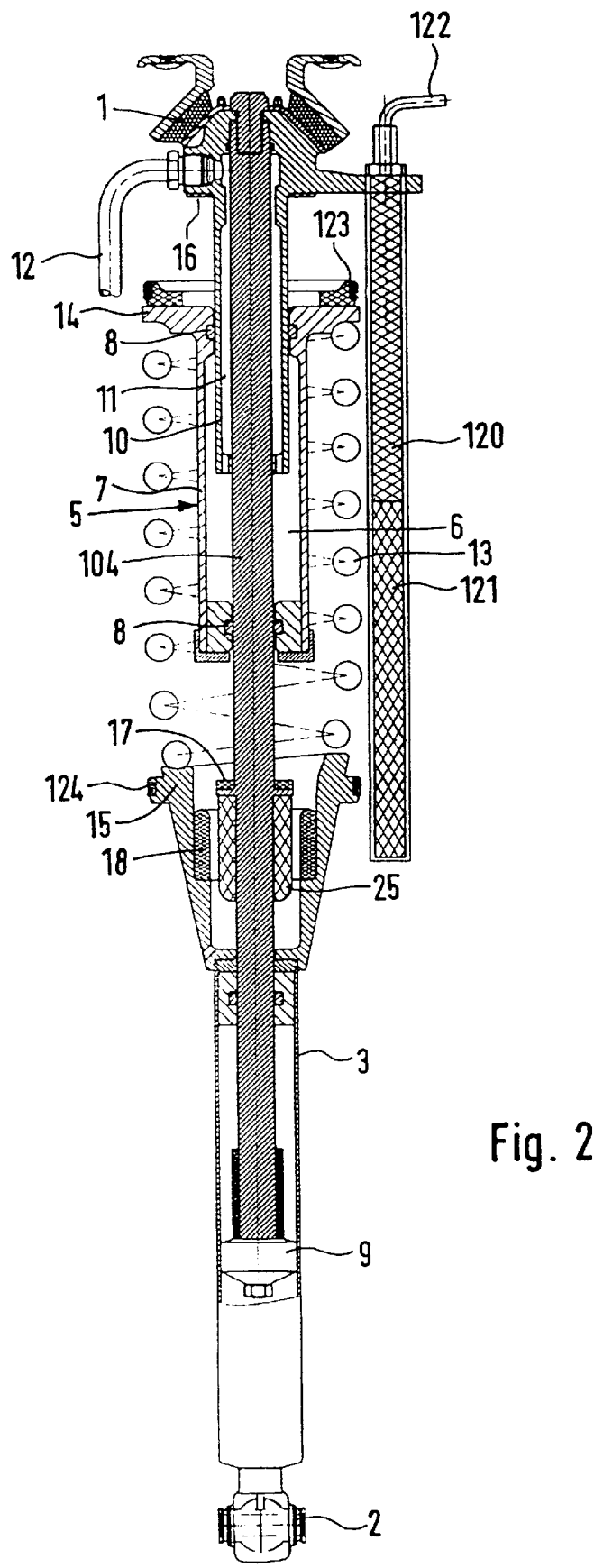
FIG. 2 is a longitudinal cross-section view of a spring shock absorber device similar to FIG. 1, but with radially externally disposed sensors of a distance measuring system.

The above-described body is present in the same way in the two embodiments shown in FIGS. 1 and 2. Differences exist only in the design of the distance measuring system.

In the embodiment according to FIG. 1, the piston rod 4 has a cavity 19 over its entire length.

This cavity 19 is fitted with two sensors 21 (first sensor) and 20 (second sensor). These sensors 20, 21 are configured as measuring coils with a body according to DE 42 25 968 A1 which can be supplied with electricity via a feed line 22 which is conducted out of the center of the piston rod 4. The sensors 20, 21 are each assigned position transmitters 23, 24 in the cylindrical housing 7 and at the open end of the damping cylinder 3. These position transmitters 23, 24 are aluminum rings which additionally fulfil the function of an axial closure of the operating spaces of the hydraulic adjusting device 5, on the one hand, and of the damping cylinder 3, on the other hand. Here, the position transmitters 23, 24 have the function of a measurement object assigned in each case to the sensors 20, 21 configured as measuring coils in the sense of the distance measuring system device according to DE 42 25 968 A1. In order to be able to use that known distance measuring system, the piston rod 4 is made of a non-magnetizable material, such as for example ceramic, aluminum, austenitic special steel or the like. The position transmitters 23, 24 are made of aluminum.

With a predetermined setting of the hydraulic device 5 remaining unchanged in relation to the active installed length of the vibration damper, the clearance of the vehicle body from an assigned guide element of a wheel can be determined by the position transmitter 24.

In contrast, the axial assignment of the piston rod 4 relative to the cylindrical housing 7 of the hydraulic adjusting device 5 can be measured by the position transmitter 23.

By an evaluation of the positions of the position transmitters 23, 24, momentary actual clearances between the vehicle body and the road surface and the position of the housing 17 can be measured during travel even with an active adjusting device 5, or changes in the clearance can be determined continuously in terms of size.

The arrangement is also suitable in the same manner for the use of magnetostrictive sensors. Instead of the two measuring coils, the sensors 20, 21 consist of waveguides, and magnets are used as position transmitters 23, 24.

A particular advantage of the embodiment according to the present invention consists in being able to conduct the necessary sensor connection cables out of the spring leg to the outside without any contact to the hydraulic fluid within the device. Additionally, the sensor device of the measuring system accommodated in the piston rod 4 is protected from environmental influences by the piston rod itself as a housing for the sensor device. Moreover, the expenditure for assembly is considerably reduced compared to sensors mounted externally or in hydraulic fluid.

In the embodiment according to FIG. 2, the sensors 20, 21 of the distance measuring system according to the embodiment in FIG. 1 are replaced by sensors 120, 121 which are fitted radially externally of the piston rod 104 but which are connected to the latter. In place of the position transmitters 23, 24 which are shown in each instance in FIG. 1 at the adjustable cylindrical housing 7 and at the damping cylinder 3, in the embodiment according to FIG. 2, the annular position transmitters 123, 124 are fitted in each instance radially externally at the abovementioned parts. The function of the distance measuring system is in principle the same, despite the different assignment of the sensors and position transmitters. The embodiment according to FIG. 2, having elongate sensors 120, 121 lying radially externally of the piston rod 104, is particularly advantageously suitable for short spring legs, in which the sensors cannot readily be accommodated in the piston rod 104, for reasons of space and strength.

In principle, the distance measuring systems described in the illustrative embodiments are advantageously usable in the case of all feasible types of mutually telescopic connecting elements of variable clearance.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Spring damper device configured to be arranged between a wheel and a body of a motor vehicle, comprising a damper cylinder and a piston rod co-operating with the latter, the damper device being directly articulatable between the body of the motor vehicle and a guide element of the wheel, a spring tensioned between a body-side and a wheel-side abutment, the clearance between the abutments being variable by a hydraulic adjusting device and measuring devices operable without contact therebetween to determine an installed length of the damper and clearance of the abutment for the spring, wherein the damper and the spring extend coaxially, the hydraulic adjusting device comprises a cylindrical housing configured to engage with an annular clearance around the piston rod and is sealed and guided radially at axial ends relative to this piston rod, the cylindrical housing being displaceable relative to the piston rod by hydraulic pressure acting on the annular space, and the measuring devices comprise a position transmitter, one being fitted to the damping cylinder and another being fitted to the adjusting device, a sensor fixedly connected to the piston rod being assigned to each position transmitter, the sensors being situated in a common tubular holder.

* * * * *